2,953,559
HETEROPOLYPEPTIDES

Walter A. Darlington and Harold I. Weingarten, Dayton, Ohio, assignors to Monsanto Chemical Company, St. Louis, Mo., a corporation of Delaware No Drawing. Filed Nov. 2, 1956, Ser. No. 619,966

3 Claims. (Cl. 260—112)

The present invention relates to polypeptides and more particularly provides new and valuable heteropolypeptides and methods of inhibiting the multiplication of virus in which said heteropolypeptides are used.

According to the invention there are provided heteropolypeptides wherein from substantially one-third to two-thirds of the polymer chain of said polypeptides consist of the recurring DL-alanyl unit:

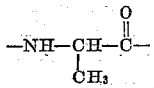

with the balance being substantially equimolar proportions of the recurring phenylalanine unit:

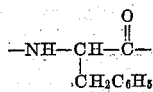

and the recurring DL-ornithyl hydrohalide unit:

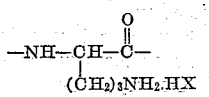

in which X is a salt-forming anion, the average molecular weight of said heteropolypeptide being from 1,500 to 10,000.

For convenience, since the present heteropolypeptides are made up of three different recurring units, they will be hereinafter referred to as terpolymers.

The present terpolymers are prepared by a condensation reaction, involving carbon dioxide cleavage, of the N-carboxyanhydrides of DL-alanine, DL-phenylalanine and the N-carboxyanhydride of δ-carbobenzyloxy-DL-ornithine to give a terpolymer consisting of DL-alanyl, DL-phenylalanyl and δ-carbobenzyloxy-DL-ornithyl units, subsequent removal of the carbobenzyloxy radical by treatment with a hydrohalide, and recovery of the hydrohalide of a DL-alanyl-DL-phenylalanyl-DL-ornithyl heteropolypeptide. Advantageously, we dissolve from substantially 1 to 4 mols of the N-carboxy-DL-alanine anhydride, substantially 1 mole of the N-carboxy-DL-phenylalanine anhydride, and substantially 1 mole of the δ-carbobenzyloxy-N-carboxy-DL-ornithine anhydride in an inert solvent, add to the resulting solution a small quantity, say, from 0.01% to 2% of a polymerization initiator comprising a compound having a labile hydrogen atom and allow the resulting reaction mixture to stand at ordinary or increased temperatures until formation of a terpolymer consisting of DL-alanyl, DL-phenylalanyl and δ-carbobenzyloxy-DL-ornithyl units has been completed. At this point the terpolymer is generally insoluble in the solvent which has been used for the reaction, and completion of the polymerization reaction is evidenced by cessation in precipitation of product. In the event that the polymerization has been effected in a liquid which dissolves the terpolymer, progress of the reaction can be gauged by noting the change in viscosity of the reaction mixture. Since the reaction is accompanied by evolution of carbon dioxide, completion of the reaction may also be determined by noting cessation of the evolution of this by-product.

The media in which the polymerization is effected are generally inert solvents, i.e., liquids which dissolve the anhydrides at the reaction temperature and which do not react with either the anhydrides or the terpolymer. Suitable solvents are, e.g., dioxane, nitrobenzene, xylene, benzene, dimethylformamide, acetone, chloroform, carbon tetrachloride, chlorobenzene, trichloroethylene, cyclohexanone, ethyl acetate, etc. As will be appreciated by those skilled in the art, the nature of the solvent is a factor to be considered in arriving at the temperature conditions which are to be employed, e.g., obviously the use of ether as a solvent will require operation at substantially low temperatures.

Although formation of the DL-alanyl-DL-phenylalanyl-δ-carbobenzyloxy-DL-ornithyl terpolymer will take place thermally, i.e., by simply heating a solution of the three N-carboxy anhydrides, we have found that the average molecular weight of the product can be better controlled and the reaction time can be substantially shortened by operating in the presence of a polymerization initiator comprising a basic compound having a labile hydrogen atom, for example, ammonia and any primary or secondary straight chained or cyclic amine such as ethylamine, butylamine, allylamine, dimethylamine, chloroethylamine, β-phenethylamine, benzylamine, aniline, β-naphthylamine, N-ethylaniline, sarcosine dimethylamide, diethylenediamine, etc. Pyridine and triethylamine containing water as a trace impurity may also be used. Other basic compounds having a labile hydrogen such as the alcohols, phenols and thiols may be employed as polymerization initiators, but the amines are preferred because their use does not lead to possibly undesirable side-reactions.

The molar ratio of DL-alanyl units to the DL-phenylalanyl and δ-carbobenzyloxy-DL-ornithyl units in the terpolymer is determined by the reactant proportions employed. Generally, the use of a 1:1:1 molar ratio mixture of the three N-carboxy anhydrides yields a terpolymer in which the DL-alanyl, DL-phenylalanyl and the δ-carbobenzyloxy-DL-ornithyl units are present in a 1:1:1 ratio, and the use of a 3:1:1 N-carboxy-DL-alanine anhydride-N-carboxy-DL-phenylalanine anhydride-δ-carbobenzyloxy-N-carboxy - DL - ornithine anhydride mixture gives a terpolymer in which the DL-alanyl, DL-phenylalanyl and δ-carbobenzyloxy-DL-ornithyl units are present in a 3:1:1 molar ratio. When it is desired to prepare a terpolymer in which two-thirds of the chain structure consists of DL-alanyl units, there is employed 4 moles of the N-carboxy-DL-alanine anhydride to one mole each of the other two anhydrides.

The carbobenzyloxy radical may be readily cleaved from the terpolymer by treating it with a hydrohalide, before or after separating it from the initial reaction mixture. The carbobenzyloxy-containing terpolymer may be recovered from the reaction mixture in which it was formed by filtration when the product is a precipitate or by distilling off the solvent if the product be soluble in the initially employed solvent. The recovered carbobenzyloxy-containing terpolymer is then subjected to cleavage by mixing it with the hydrohalide, preferably with an anhydride solution of the hydrohalide in an inert solvent such as glacial acetic acid. The cleaved product is the hydrohalide of DL-alanyl-DL-phenylalanyl-DL-ornithyl heteropolypeptide terpolymer. The cleavage step proceeds smoothly to give substantially theoretical yields of the hydrohalide, particularly when hydrogen bromide is the halide used. However, other hydrogen halides, e.g., hydrogen chloride or hydrogen iodide may be used, whereby there is formed in the cleavage step the heteropolypeptide hydrochloride or hydroiodide. Salts other than the hydrobromides may also be conveniently prepared from the corresponding heteropolypeptide hydrobromide by treating the hydrobromide with a salt of metal which forms difficultly soluble bromides, removing the metal bromide thus formed and treating the residue with the desired acid, e.g., benzoic acid, acetic acid, tartaric acid, picric acid, phosphoric acid, perchloric acid, hydrochloric acid, etc., whereby there are formed, e.g., the corresponding DL-alanyl-DL-phenylalanyl heteropolypeptide benzoates, acetates, tartrates, etc. Useful metal salts for this purpose are, e.g., silver acetate or phosphate, etc.

The present DL-alanyl-DL-phenylalanyl-DL-ornithyl heteropolypeptide salts are stable, well-defined powdery solids which are generally soluble in water and insoluble in ethanol, ether, acetone, dioxane and chlorobenzene. They are advantageously employed for a variety of purposes in industrial, agricultural and medicinal fields, e.g., as anti-static agents for textiles and other fibrous products, as emollient bases, as plant growth regulants and as bactericides. The present terpolymer salts are particularly valuable in that they inhibit the multiplication and growth of viruses after infection has occurred, especially those which cause mosaic diseases in tobacco.

Although a great deal of research has been directed at tobacco mosaic virus control, the search for chemicals that will interfere with or inactivate tobacco mosaic virus after it has been established in the tobacco plant has not been at all fruitful. While a number of compounds when mixed with infectious tobacco mosaic virus in vitro form non-infectious complexes with it (F. C. Bawden, "Plant Viruses and Virus Diseases," Chronica Botanica, Waltham, Mass., 1950, p. 244), the infectivity of the virus is frequently restored after dilution. Hence successful in vitro experiments rarely foretell success in treatment of plants by spraying or dusting already infected plants.

The invention is further illustrated, but not limited, by the following examples:

*Example 1*

To 110 ml. of dry dioxane there were added 0.94 g. of the N-carboanhydride of DL-alanine, 0.63 g. of the N-carboanhydride of DL-phenylalanine and 1.0 g. of N-carboanhydride of δ-carbobenzyloxy-DL-ornithine. To the resulting solution there was then added 0.110 g. of diethylamine and the whole was allowed to stand for two days. At the end of that time the whole was poured into an equal volume of water. The precipitate which formed was filtered off, washed several times with distilled water and vacuum dried to give 0.8 g. of terpolymer wherein substantially three-fifths of the terpolymer consists of recurring DL-alanyl units, with the balance being equimolar proportions of recurring DL-phenylalanyl and recurring δ-carbobenzyloxy-DL-ornithyl units. End group analysis of said terpolymer showed an average of 20 amino acid residues per polymer molecular and a consequent average molecular weight of 2500.

The carbobenzyloxy radical was cleaved from the above terpolymer by adding to it 10 g. of a glacial acetic acid hydrogen bromide solution, and shaking the resulting mixture for 4 hours, and pouring the whole in dry ether. The precipitate which formed was collected and dried to give a powdery heteropolypeptide wherein substantially three-fifths of the polymer chain consists of recurring DL-alanyl units with the balance being substantially equimolar proportions of DL-phenylalanyl and DL-ornithyl hydrobromide units.

*Example 2*

The inhibiting effect of the 3:1:1 DL-alanyl-DL-phenylalanyl-DL-ornithyl hydrobromide polypeptide of Example 1 against the multiplication of tobacco mosaic virus was determined substantially according to the method of Commoner et al., Arch. Biochem. Biophys., 27 271 (1950). Briefly, the procedure involves inoculation of a young leaf of a healthy plant with the virus and, after 24 hours, contact of portions of the inoculated leaf with the test compound.

The leaf was inoculated with Johnson tobacco virus by rubbing its entire surface with a gauze pad moistened with a phosphate buffer solution (pH 7.0) containing 200 μg. of the virus per milliliter. After inoculation, the leaf was placed under a bell-jar with its petiole in water for 24 hours. At the end of this time, six 0.5″ discs were punched from the leaf, weighed, washed in water and placed in a 3.5″ Petri dish containing an 0.0067% concentration of the said test heteropolypeptide in 15 ml. of half-strength Vickery's solution (Vickery et al., Bull. Conn. Agr. Expt. Sta., 399 (1937)) which had been prepared to have a final concentration of $5 \times 10^{-3}$ mole of $KH_2PO_4$. A "control" was prepared by placing another set of six discs which had been punched from the inoculated leaf into a Petri dish containing 15 ml. of the same Vickery's solution but no terpolymer. Both dishes of discs were incubated for seven days under fluorescent light of 170 foot candles. At the end of that time the discs were removed and two groups of three were made up from each dish in order to provide "checks." The tobacco mosaic virus content of each group was determined as described by Commoner et al. (loc cit) except that the final washing step thereof was omitted because it had been previously observed by us that this step in the isolation procedure results in some loss of virus. The colorimetric measurements were made at 750 Mμ in a Coleman Universal Spectrophotometer and the amount of virus was read from a standard curve prepared with known amounts of the tobacco mosaic virus.

Employing this procedure it was found that the virus content of the group of discs which had been contacted with the present DL-alanyl-DL-phenylalanyl-DL-ornithyl terpolymer was only 28% of that of the "control" discs, i.e., a 72% inhibition of the virus was effected by the present terpolymer.

The marked inhibition of tobacco mosaic virus growth by the present terpolymer is surprising, for generally polypeptides having alanyl or phenylalanyl units do not demonstrate this effect. Thus, using the above-described testing procedure the following terpolymers were found to have no inhibiting effect on tobacco mosaic virus:

(I) 3:1:1 DL-alanyl-DL-phenylalanyl-DL-lysyl hydrobromide mol. wt. 2900.

(II) 3:1:1 DL-alanyl-DL-valyl-diaminobutyryl hydrobromide, mol. wt. 4400.

(III) 3:1:1 DL-alanyl-aminoisobutyryl-L-lysyl hydrobromide, mol. wt. 2600.

(IV) 3:1:1 DL-alanyl-DL-ethionyl-DL-lysyl hydrobromide, mol. wt. 3560.

(V) 3:1:1 DL-alanyl-DL-methionyl-DL-lysyl hydrobromide, mol. wt. 3460.

(VI) 3:1:1 DL-alanyl-DL-tryptophanyl-DL-lysyl hydrobromide, mol. wt. 4030.

(VII) 1:1:1:1 Glycyl-DL-alanyl-DL-valyl-DL-lysyl hydrobromide, mol. wt. 6550.

Note that in (I) above, the terpolymer resembles the terpolymer of Example 1 in that the DL-alanyl and the DL-phenylalanyl radical are present and that the molecular weights are of the same order. Apparently, the presence of the DL-lysyl unit instead of the DL-ornithyl unit results in a terpolymer with no inhibiting effect at the same test concentration.

Heteropolypeptides consisting of DL-alanyl, DL-phenylalanyl and DL-ornithyl units and a molecular weight of from 1,500 to 10,000 generally inhibit the multiplication of tobacco mosaic virus. While those of these terpolymers are preferred in which the proportion of DL-alanyl units is greater than that of either the DL-phenylalanyl or DL-ornithyl units, terpolymers having a 1:1:1 DL-alanyl-DL-phenylalanyl-DL-ornithyl ratio also possess inhibiting properties against the virus. However, at least one-third of the terpolymer should consist of DL-alanyl units.

What we claim is:

1. A condensation terpolymer having an average molecular weight of from 1,500 to 10,000 and containing in the terpolymer chain recurring units of the formulas (I) 

(II) 

(III) 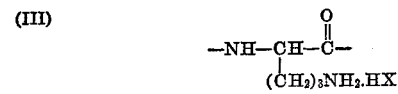

in which X is halogen, said unit (I) constituting from one-third to about two-thirds of the terpolymer, with the balance of the terpolymer being the units (III) and (II) in about equal amounts.

2. A condensation terpolymer having an average molecular weight of from 1,500 to 10,000 and containing in the terpolymer chain recurring units of the formulas (I) 

(II) 

and (III) 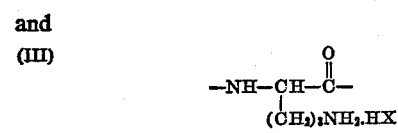

in which X is halogen, said unit (I) constituting about three-fifths of the terpolymer with the balance of the terpolymer being the units (III) and (II) in about equal amounts.

3. A condensation terpolymer having an average molecular weight of from 1,500 to 10,000 and containing in the terpolymer chain recurring units of the formulas (I) 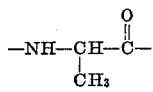

(II) 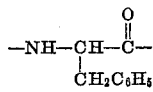

(III) 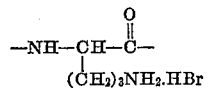

said unit (I) constituting about three-fifths of the terpolymer with the balance of the terpolymer being the units (III) and (II) in about equal amounts.

References Cited in the file of this patent
UNITED STATES PATENTS

| | | |
|---|---|---|
| 2,273,849 | Epstein et al. | Feb. 24, 1942 |
| 2,471,339 | Minich et al. | May 24, 1949 |
| 2,498,665 | Emerson | Feb. 28, 1950 |
| 2,723,973 | Boothwyn et al. | Nov. 15, 1955 |

OTHER REFERENCES

Anson: Advances in Protein Chemistry, vol. 6, pages 134–45 (1951).

Tsuyuki et al.: Proceedings of the Soc. for Experimental Biology and Medicine, vol. 91, page 318, Jan. 9, 1956.

Sela et al.: J. Am. Chem. Soc., vol. 78, page 746, Feb. 20, 1956.